June 17, 1952  P. MATTIESON  2,601,160
WEEDLESS FISHHOOK
Filed March 2, 1950

INVENTOR.
PAUL MATTIESON.
BY
Samuel C. Weisman
ATTORNEY.

Patented June 17, 1952

2,601,160

UNITED STATES PATENT OFFICE 2,601,160

WEEDLESS FISHHOOK

Paul Mattieson, Dearborn, Mich.

Application March 2, 1950, Serial No. 147,250

2 Claims. (Cl. 43—44.8)

This application is a continuation in part of my copending application Serial No. 80,820, of March 11, 1949, now Patent No. 2,506,883, issued May 9, 1950. The invention pertains to a novel non-snagging fish hook designed to be attached to a fish lure.

It is well known that unbaited fish hooks frequently become snagged in weeds. The principal object of this invention is to provide a device that guards the sharp end of the hook against snagging. Another object is to provide, in the same construction, a part that wedges the flesh against the sharp end or prong of the hook, so that escape becomes practically impossible.

A more particular object of the invention is to provide an improved construction for holding bait of large girth, such as minnows and frogs. In the previous construction, a bait of large girth tends to obstruct the prong, with the result that the fish is often able to take the bait without reaching the prong.

These objects are accomplished by means of an attachment that is fastened to a conventional fish hook of the type comprising a straight shank having a bent and pronged end. The attachment is a length of rather fine wire shaped to form a pair of fingers and a double strand, all having one end in common. This end is fastened to the free end of the shank at or near its eyelet. The fingers are positioned so that their free ends extend somewhat beyond the prong and lie outwardly and at opposite sides thereof. The double strand has its unfastened end slidably mounted on the shank, preferably by means of a coil in the wire. The double strand is also bowed towards the fingers.

The fingers constitute a guard that prevents the prong from snagging in the weeds. However, they are of such resiliency that a bite will depress them to expose the prong for penetration. The bowed double strand functions to wedge the flesh of the catch against the prong, whereby escape is practically impossible, as described in the copending application.

The bowed double strand has one end slidable on the shank. This arrangement permits the bait to be inserted and held within the bow or between the threads of the double strand, because of the resiliency of the wire. In such case the hook is left bare, but may also be baited if desired. However, a live bait held by the wire will remain alive longer than on the hook.

With reference to the last named object of the invention, the shank of the hook is formed with a bend or depression that extends outward or away from the prong. The depression is located preferably close to the fastened parts of the wire members. The bait is seated in the depression and consequently does not bring the bowed strand as close to the prong as would otherwise be the case. The prong is therefore well exposed to pierce the catch.

The invention is fully disclosed by way of example in the following description and in the accompanying drawings in which.

Reference to these views will now be made by use of like characters which are employed to designate corresponding parts throughout.

Figure 1:
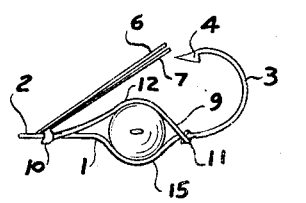
Figure 1 is a side elevation of the hook with bait therein.
Figure 2:
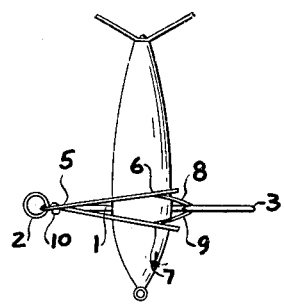
Figure 2 is a top plan view.
Figure 3:
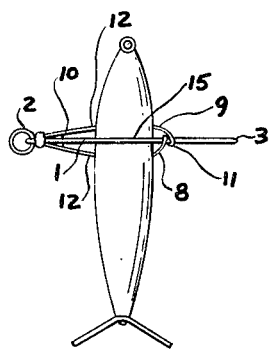
Figure 3 is a bottom plan view.

In Figure 1 is shown a conventional fish hook including a shank 1 with an eyelet 2 at one end thereof, the other end being bent to form a bill 3 in an arc of about 180 degrees and formed at the extremity with the usual sharp point 4. The appliance that constitutes the invention comprises a length of wire shaped by suitable dies to the form shown.

The device is substantially V-shaped in side elevation with both free ends of the wire being disposed at the free end of one of the sides of the V. The strands constituting this side are crossed at the vertex at 5, thus forming a pair of fingers 6 and 7. These fingers diverge toward the point 4 and extend somewhat beyond the free end thereof. The free ends of the fingers lie at opposite sides of the point and outwardly thereof, for a purpose that will presently be described.

The other side of the V is a continuous double strand comprising two single strands 8 and 9. The device is fixed to the shank 1 near the eyelet 2, preferably by soldering the threads to the shank as indicated by the numeral 10. At the other end, the double strand is slidably mounted on the shank. Also, the double strand is bowed at 12 toward the fingers 6, 7. It will be understood that the preformed attachment may be assembled on the fish hook in any suitable manner.

The eyelet 2 may be attached to a lure as well known in the art. The bait is fitted either beneath the bow or between the strands 8, 9. In this operation the wire is temporarily distorted and, because of its resiliency, springs back into shape to retain the bait. The point 4 need not be baited, although it may be, and a live bait will live longer if held by the wire than by the point.

The shank of the hook has an outward bend or depression 15. It is outward in the sense that it dips away from the point 4, extending outside the normal periphery of a straight-shank hook. On the shank the depression is located between the eyelet 2 and a point directly opposite the point 4, and preferably adjacent to the eyelet 2 where the strands 8, 9 are soldered at 10. The strands 8, 9 spaced laterally and oppositely from the member 15 bend the bait against this member and thereby secure it in the lure.

With a straight shank and relatively large bait, the bowed strands 12 are bent high and rather close to the point 4. The result is that the point is substantially obstructed, and the fish could take the bait without biting the point. The depression 15 in the present construction obviates this result by dropping the bait well away from the point. A similar spacing of the bait from the point could otherwise be achieved only by using a larger hook. The invention therefore permits the use of a smaller hook for a given size of bait. The smaller hook has advantages in catching certain kinds of fish such as bass where a large bait and relatively small hook is desirable.

A fish attracted by the lure and biting on the hook will bite with sufficient pressure to depress the fingers 6, 7, thereby exposing the point 4 for penetrating into the roof of the mouth of the fish. In other words, the fingers are of such resiliency as to yield under pressure. The pull on the line or the resistance of the catch will cause the bowed double strand to wedge the flesh against the point. Escape is then practically impossible.

The invention is applicable in like manner to multiple hooks, and the device may be produced as a multiple unit. Artificial bait is not necessary but may be used if desired.

Although a specific embodiment of the invention has been illustrated and described, it will be understood that various alterations in the details of construction may be made without departing from the scope of the invention as indicated by the appended claims.

What I claim is:

1. A fishing lure comprising a hook having a curved bill terminating in a point, a shank extending from the curved bill and terminating in an eyelet, the portion of the shank between the eyelet and the bill being curved outwardly to define a recess between the eyelet and the bill, a resilient member secured to the shank adjacent to the eyelet and mounted on the bill adjacent to the shank and curved so as to define a recess diametrically opposite the recess of the shank, the combined recesses being adapted to clamp an artificial bait and hold the same between the eyelet and the bill, the resilient member being spaced a substantial distance from the point of the hook, and a bifurcated weed guard secured at the eyelet and extending at an acute angle to the shank in a direction to space the same outwardly from the point of the hook at opposite sides thereof laterally and sufficiently spaced from the recessed portion of the resilient member, whereby a fish attempting to bite the bait will force the guard a sufficient distance below the point of the hook to permit the point to penetrate into the flesh of the fish.

2. A fishing lure as set forth in claim 1, wherein said resilient member comprises two parts spaced laterally intermediate the length thereof, whereby to bend and secure the bait against said shank at the recess thereof.

PAUL MATTIESON.

REFERENCES CITED

The following references are of record in the file of this patent:

UNITED STATES PATENTS

| Number | Name | Date |
|---|---|---|
| 615,170 | Henckler | Nov. 29, 1898 |
| 831,552 | Hallstrom | Sept. 25, 1906 |
| 1,261,601 | Ore | Apr. 2, 1918 |
| 1,323,394 | Jones | Dec. 2, 1919 |
| 1,766,279 | Brown | June 24, 1930 |
| 2,148,074 | Kaspick | Feb. 21, 1939 |